US008881721B2

(12) United States Patent   (10) Patent No.: US 8,881,721 B2
Morber et al.              (45) Date of Patent:    Nov. 11, 2014

(54) SOLAR RECEIVER DIAPHRAGM

(75) Inventors: John J. Morber, Taneytown, MD (US); David Velasco, Clifton, NJ (US); Kristopher T. Heick, Bel Air, MD (US); Matthew M. Kapelanczyk, Baltimore, MD (US); Christina M. Gallo, Baltimore, MD (US); John Ditri, Huntingdon Valley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 568 days.

(21) Appl. No.: 13/173,331

(22) Filed: Jun. 30, 2011

(65) Prior Publication Data

US 2013/0000633 A1     Jan. 3, 2013

(51) Int. Cl.
*F24J 2/46*    (2006.01)
*F24J 2/05*    (2006.01)
*F24J 2/07*    (2006.01)
*F24J 2/14*    (2006.01)

(52) U.S. Cl.
CPC .............. *F24J 2/055* (2013.01); *F24J 2/4616* (2013.01); *Y02E 10/44* (2013.01); *Y02E 10/41* (2013.01); *F24J 2/14* (2013.01); *F24J 2/07* (2013.01)
USPC ........................................ 126/652; 126/651

(58) Field of Classification Search
CPC .............. F24J 2/055; F24J 2/46; F24J 2/4645
USPC .................................. 126/651, 652
See application file for complete search history.

(56) References Cited

U.S. PATENT DOCUMENTS

| 1,294,466 | A | | 2/1919 | Houskeeper | |
| 1,560,690 | A | | 11/1925 | Houskeeper | |
| 2,687,146 | A | * | 8/1954 | Ferguson | 92/99 |
| 4,133,298 | A | * | 1/1979 | Hayama | 126/591 |
| 4,186,725 | A | * | 2/1980 | Schwartz | 126/694 |
| 4,231,353 | A | * | 11/1980 | Kanatani et al. | 126/652 |
| 4,523,578 | A | * | 6/1985 | Mahdjuri Sabet | 126/677 |
| 4,674,477 | A | * | 6/1987 | Tabor | 126/652 |
| 4,703,749 | A | | 11/1987 | Morse | 126/436 |
| 4,803,972 | A | * | 2/1989 | Janson | 126/710 |
| 6,155,250 | A | | 12/2000 | Mieda et al. | 126/657 |
| 6,324,870 | B1 | * | 12/2001 | Chabin et al. | 65/154 |
| 6,705,311 | B1 | * | 3/2004 | Schwartzman et al. | 126/657 |
| 7,562,655 | B2 | * | 7/2009 | Kuckelkorn et al. | 126/569 |
| 8,097,318 | B2 | * | 1/2012 | Mientkewitz et al. | 428/36.9 |
| 2008/0216823 | A1 | * | 9/2008 | Kmetovicz et al. | 126/704 |
| 2012/0272950 | A1 | * | 11/2012 | Martinez Sanz et al. | 126/709 |

OTHER PUBLICATIONS

*Heat Loss Testing of Schott's 2008 PTR70 Parabolic Trough Receiver*; Burkholder et al; technical Report—NREL/TP-550-45633; NREL, May 2009.

(Continued)

*Primary Examiner* — Avinash Savani
(74) *Attorney, Agent, or Firm* — Renner Kenner Greive Bobak Taylor & Weber

(57) ABSTRACT

A receiver used in a solar collection assembly includes a tube adapted to carry a heat transfer medium therethrough. An envelope surrounds the tube and has opposed ends and a diaphragm is interposed between each end and the tube to support the tube from the envelope. The diaphragm comprises radially oriented convolutions which minimizes the axial length of the diaphragm and hence reduces shading of the absorber tube.

8 Claims, 3 Drawing Sheets

(56) References Cited

OTHER PUBLICATIONS

*Heat Transfer Analysis and Modeling of a Parabolic Trough Solar Receiver Implemented in Engineering Equation Solver*; Forristall; NREL; NREL/TP-550-34169, Oct. 2003.

*The Study of One-Through Solar Absorber Receiver*; Lei et al; Institute of Electrical Engineering, Chinese Academy of Sciences; Beijing, China; Apr. 6, 2009.

*A cavity-receiver containing a tubular absorber for high-temperature thermochemical processing using concentrated solar energy*; Melchior et al; International Journal of Thermal Sciences 47; Jan. 2008.

\* cited by examiner

SOLAR RECEIVER DIAPHRAGM

TECHNICAL FIELD

Generally, the present invention is related to solar collection assemblies. In particular, the present invention is directed to the construction of a heat collection element which forms the central part of the solar collection assembly. Specifically, the present invention is directed to a diaphragm used in a glass-metal interface of an absorber tube in the heat collection element so as to improve the efficiency of the solar collection assembly.

BACKGROUND OF THE INVENTION

Solar collection assemblies, sometimes referred to as parabolic trough receivers, are used to collect radiation from the sun for conversion to a usable form of energy. Solar collection assemblies include mirrored surfaces, supported by truss-like structures, configured to track the sun's movement across the sky and collect solar radiation. The mirrored surfaces reflect the sun's rays toward a heat collection element (HCE), commonly referred to as a receiver, maintained at a focal point of the reflector's parabolic shape. A heat transfer fluid flows through the receiver and is heated by the reflected and concentrated radiation. The fluid is ultimately delivered to a heat transfer system where the heat is converted to electricity or other usable form of energy. A typical solar array field may use up to 80,000 or more receivers.

The primary function of the heat collection element is to absorb as much of the incident solar energy as possible, and to re-emit as little of that energy as possible in the form of thermal radiation. This goal is achieved by enclosing an inner absorber tube within a surrounding outer glass envelope. The outer surface of the absorber tube is coated with a solar selective coating which is designed to absorb as much of the incident solar energy as possible (typically around 95% or so) while minimizing the re-radiated losses due to thermal radiation. The outer glass envelope plays a critical role in the heat collection element. The glass envelope allows the formation of a vacuum in the annular space between the inner surface of the glass envelope and the outer surface of the absorber tube. This vacuum prevents energy loss from the absorber tube by preventing heat conduction from the absorber tube to the environment. This, in turn, maximizes the amount of absorbed solar energy which enters the heat transfer fluid within the absorber for later conversion to a more useable form.

In addition to the outer glass envelope, a leak-free sealing mechanism must be provided to enable and maintain the vacuum between the glass envelope and the absorber tube. The implementation of this seal is made difficult by the fact that the absorber tube and the glass envelope, being made of different materials, have different thermal expansion rates, and thus, expand by different amounts when heated.

A bellows interface interconnects the transfer absorber tube and the glass envelope. The purpose of the bellows is to allow for the different thermal growth rates between the glass envelope and the steel absorber tube without placing undue stress on the glass, while at the same time maintaining the vacuum conditions within an annulus between the tube and the envelope. In compensating for the expansion difference, typical bellows used in conventional receivers shield a portion of the absorber tube. This is due to the fact that the typical bellows consist of a series of convolutions which run axially along the absorber tube and thus form a barrier between the rays of the sun and the surface of the absorber tube beneath the bellows. This shielding is a significant drawback of the current bellows design. The extended length of the bellows is needed to enable proper operation of the bellows, but the extended shielding reduces the effective length of the radiation exposure to the absorber tube. The reduction in effective length in turn reduces the efficiency of the receiver, which reduces the efficiency of the solar collection assembly. The bellows on typical solar receivers shade approximately 3% to 5% of the available absorber tube surface. This results in a corresponding percentage decrease in the receiver's operating efficiency. Another constraint with the current bellows designs is their need to withstand repeated expansions and contractions, typically more than 10000 cycles over a receiver's lifetime. If the glass-metal seal provided by the bellows is broken, the ability of the receiver to perform its intended function is diminished.

Therefore, there is a need in the art to reduce the size of the bellows so as to minimize shading while maintaining a sealed connection between the metal tube and the glass envelope. And there is a need to simplify the design of the bellows so as to further improve the assembly of the receiver.

SUMMARY OF THE INVENTION

In light of the foregoing, it is a first aspect of the present invention to provide a solar receiver diaphragm.

Another aspect of the present invention is to provide a receiver used in a solar collection assembly comprising a tube adapted to carry a heat transfer medium therethrough, an envelope surrounding the tube and having opposed ends, and a diaphragm interposed between each end and the tube to support the tube from the envelope, the diaphragm comprising radially oriented convolutions.

BRIEF DESCRIPTION OF THE DRAWINGS

This and other features and advantages of the present invention will become better understood with regard to the following description, appended claims, and accompanying drawings wherein:

BEST MODE FOR CARRYING OUT THE INVENTION

Figure 1:
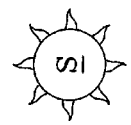
FIG. 1 is a perspective view of a solar collection assembly incorporating the concepts of the present invention.
Figure 1:
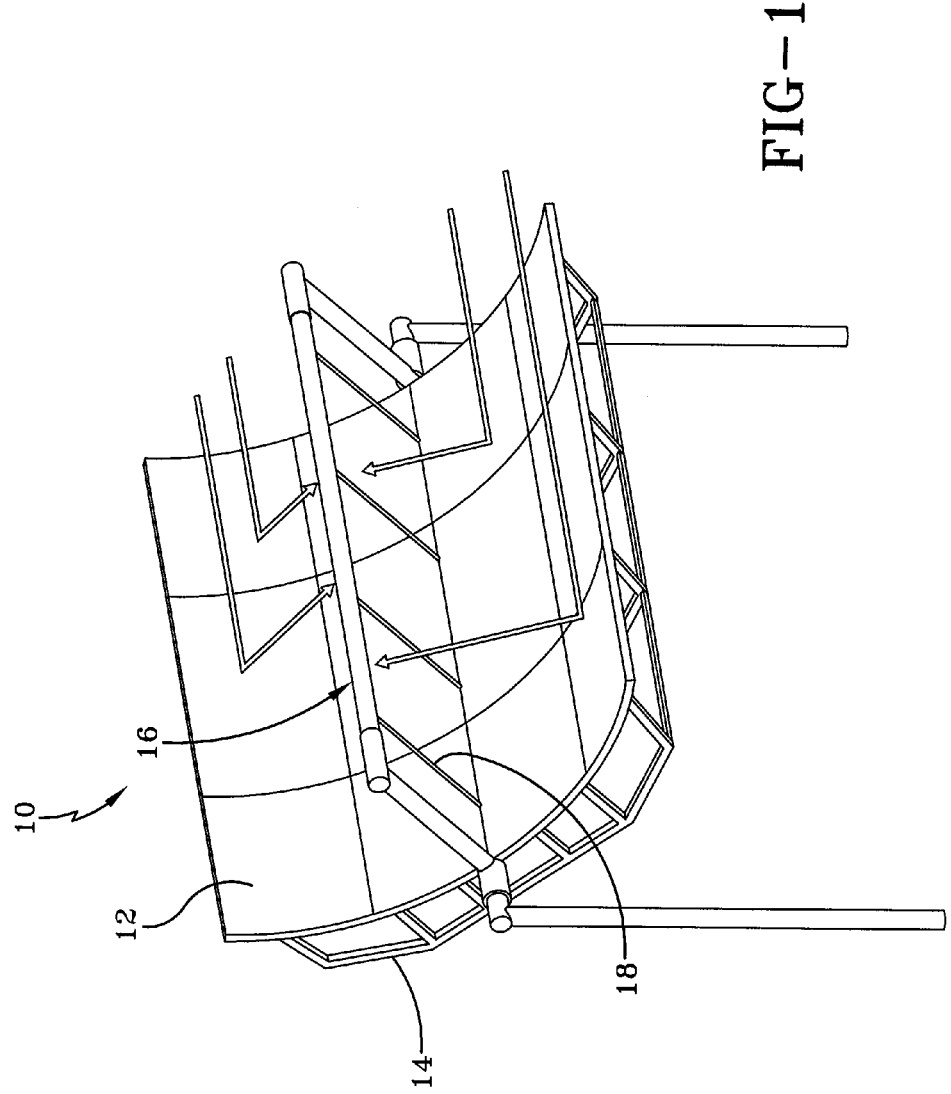

Referring now to the drawings, and in particular to FIG. 1, it can be seen that a solar collection assembly (SCA) is designated generally by the numeral 10. The assembly 10 is part of a solar energy collection system which captures solar radiation for conversion to electrical energy or some other usable power medium. The assembly 10 includes trough reflectors or mirrors 12 which, in most embodiments, are parabolic in shape. In other embodiments, the mirror could be any curved or faceted surface oriented to follow the trajectory of the Sun S. The mirrors 12 may be provided in sections such that each section can be individually configured to follow the Sun's trajectory and make most efficient use of placement of the reflectors. Or the sections of the mirror may move in tandem. Each mirror section includes a support structure 14 which is positioned on the underside of the reflector so as to support the mirrored surfaces and related attachments.

A receiver 16, also referred to as a heat collection element (HCE), is positioned and supported at a focal point of the mirror 12. The receiver 16 collects and retains the solar radiation reflected by the mirrors. Generally, radiation rays from the Sun are reflected by the mirrors to the receiver which is centrally placed and spaced apart from the mirrors 12. The receiver absorbs the incident and reflected radiation rays. A strut or struts 18 may be interposed between each section of the mirror and/or may be interposed between the apex of the mirrors and the receiver 16. An insulator may be disposed between the strut and the pipe. The struts 18 are employed in such a manner so as to minimize radiation losses and to maintain an optimal focal position of the receiver 16 within the SCA 10.

Figure 2:
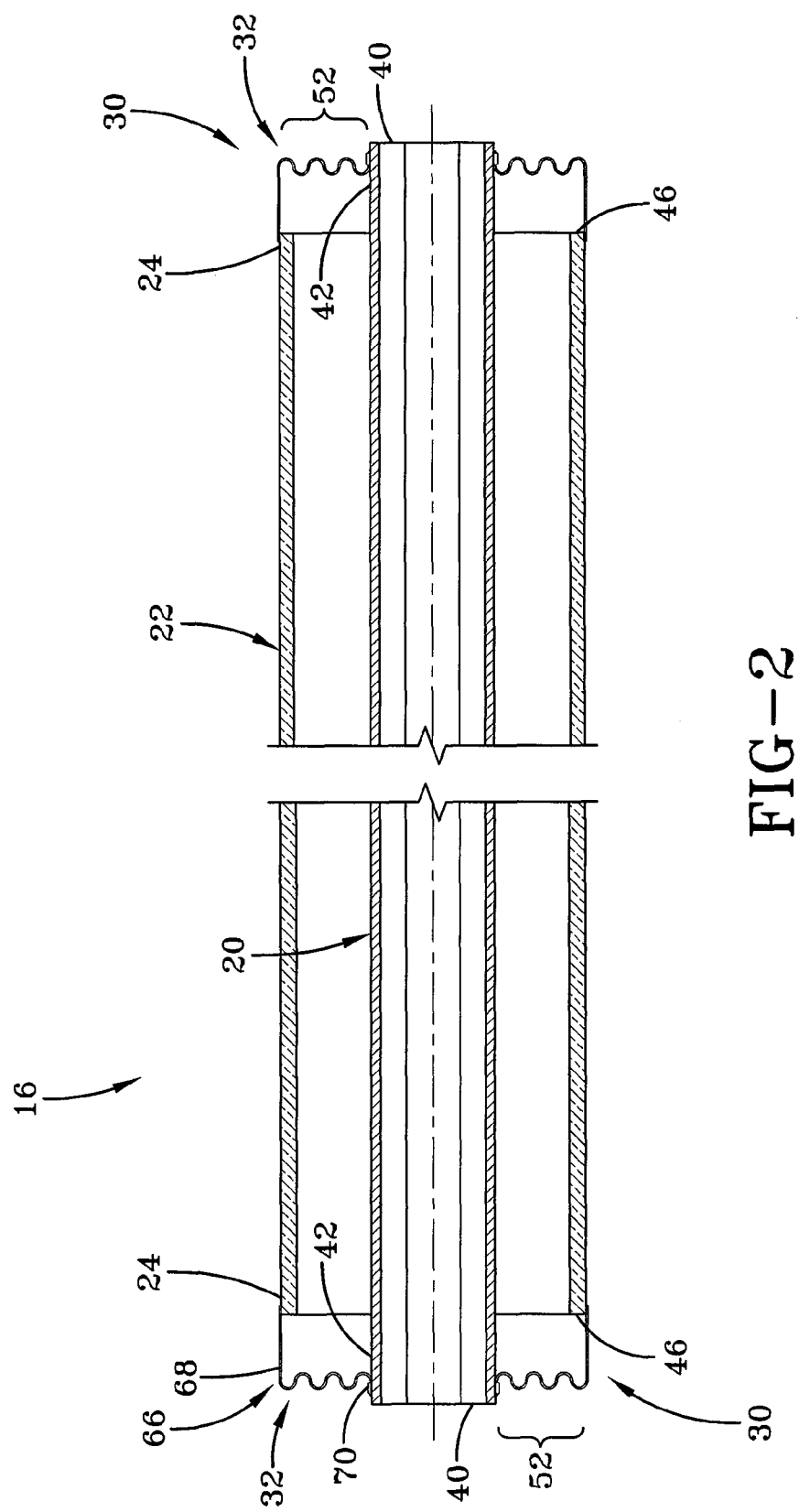
FIG. 2 is an elevational view of a receiver with a diaphragm shown in cross-section according to the concepts of the present invention.
Figure 3:
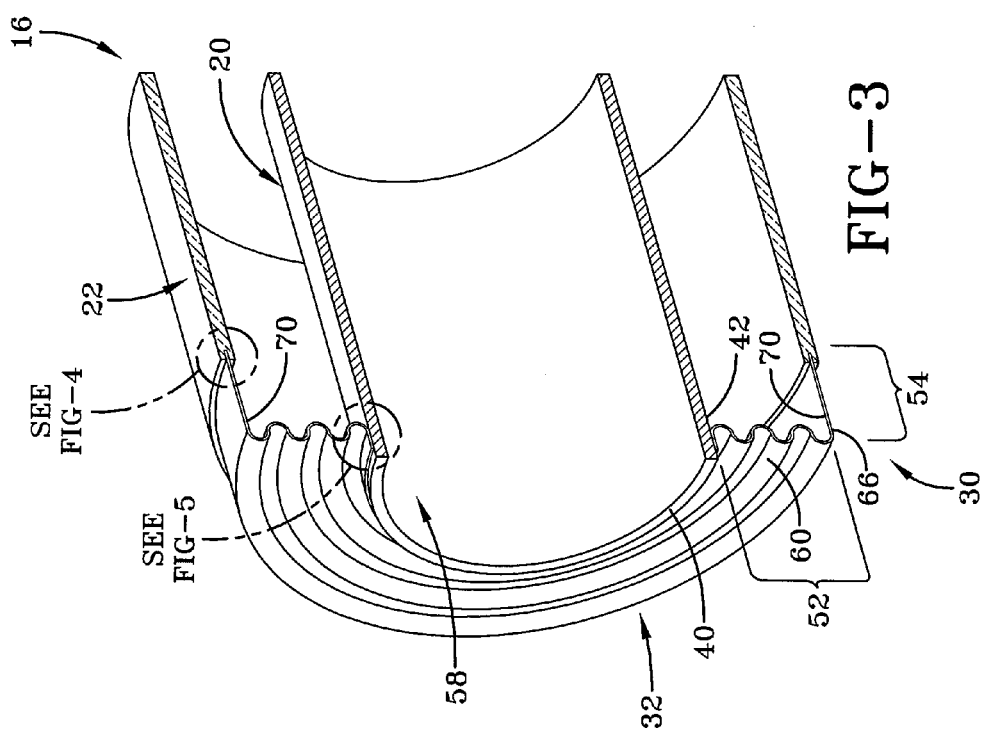
FIG. 3 a perspective view of an end of the receiver and the diaphragm in partial cross-section according to the concepts of the present invention.

Referring now to FIGS. 2 and 3, it can be seen that the receiver 16 comprises an absorber tube 20 which is centrally positioned and carries a heat transfer fluid. In most embodiments the tube 20 is a metallic construction. The elements or receivers 16 are connected end to end except those at the end of the solar collection assembly. The end elements of the solar collection assembly are connected via other tubing to a power plant. In the present embodiment, the tube is manufactured from carbon steel. Other embodiments may utilize high temperature ceramic matrix composites or any other material that has a relatively low coefficient of thermal expansion and which can meet the other operational parameters of the overall system. A thin coating of selected material is applied to the exterior of the absorber tube 20 so as to maximize the amount of sunlight which is absorbed and minimize the amount of heat which is reflected back to the glass envelope. The coatings may also be used to block infrared light to make the tube a better insulator so as to better retain heat therein. In summary, the absorber tube absorbs the heat reflected from the mirrored surfaces and captures that heat so it is not released.

A glass envelope 22, which in the present embodiment is a hollow cylindrical configuration that maintains a vacuum, encloses the tube 20. The envelope 22 has opposed ends 24. Skilled artisans will appreciate that the glass envelope forms an outer shell of the receiver 16 and in most embodiments the tube 20 is provided with a solar-selective coating as discussed. In most embodiments the glass envelope 22 is constructed of borosilicate glass and is provided with anti-reflection coatings that are applied to both the inner and outer surfaces so as to minimize the amount of sunlight which is reflected off of the envelope and maximize the amount of sunlight which is transmitted to the absorber tube.

An interface, designated generally by the numeral 30, is interposed between the ends 24 and an outer surface of the tube 20. The main purpose of the interface is to provide a means of allowing the absorber tube 20 to expand a different length than the glass envelope 22 when the entire receiver 16 heats up. The different materials (glass envelope, metal tube), have different thermal expansion rates when heated. As such, if the glass envelope were to be connected to the absorber directly, with no flexible medium in between, the glass would break rendering the receiver inoperative. Accordingly, a diaphragm 32 is interposed between each end 24 and an outer diameter of the tube 20. The diaphragm also maintains a constant spacing between the tube and the glass envelope. The tube 20 has opposed ends 40 and an end outer surface 42. Each end 24 of the glass envelope 22 provides a face 48 and an outer surface 50 that forms an outer diameter of the envelope. The diaphragm, as will be described in detail, interconnects the end outer surface 42 of the tube 20 to a surface of the glass envelope 22 at a corresponding end.

Generally, the diaphragm allows the absorber and glass envelope to expand and contract at different rates—due to their different coefficients of thermal expansion—without introducing excessive stress on the cylindrical glass material. Skilled artisans will appreciate that the diaphragm's size or axial length should be minimized so as to minimize the loss of useful sunlight. As noted in the Background Art of the present application, the glass to metal seal interface is a primary point of failure. Indeed, the primary reason for glass to metal seal failure is coefficient of thermal expansion differences between the metal and the glass.

As best seen in FIG. 3, the diaphragm 32 includes a convolution section 52 connected to an attachment ring section 54. The convolution section 52 is a stamped or hydro-formed metallic construction. In the present embodiment, the convolution section is constructed of Stainless steel. Other embodiments may employ materials such as Carbon Steel, Stainless steel, or Fe—Ni steel alloys (including Kovar™). The convolution section 52 includes a welding landing 56 which forms an inner diameter in the form of a tube hole 58. The tube hole 58 is sized to receive the end of the metal tube 20 and, in particular, end 40.

Extending from the welding landing 56 are a plurality of radial convolutions 60 which are serpentine in shape. However, skilled artisans will appreciate that other convolutions, or different shaped convolutions, may be utilized. Each set of convolutions 60 include an outer ridge 62 adjacent an inner groove 64. As shown in FIG. 3, there are three convolutions 60 although any number could be employed. The appropriate number of convolutions will be determined based on convolution geometry, material, and a required deflection, which is a result of the glass coefficient of thermal expansion, the absorber tube material coefficient of thermal expansion, the overall lengths of the receivers, and expected maximum temperature changes. The convolution 60 furthest away from the welding landing 56 provides a ring landing 66 which is secured to the attachment ring section 54 by a conventional welding process.

The attachment ring section 54 is made from a nickel-cobalt ferrous alloy. Skilled artisans will appreciate that other similar alloys may be used. The main requirement of such an alloy is that it is able to be welded or otherwise secured to the diaphragm section 52 typically constructed of metal, and the envelope 22, typically constructed of glass. The attachment ring section 54 includes a diaphragm edge 70 which is connected to the ring landing 66 with a continuous metal weld.

Figure 4:
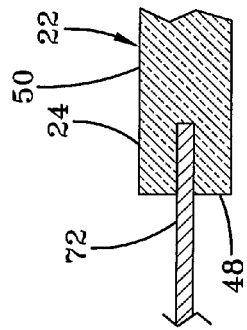
FIG. 4 is a detailed view of a connection between the diaphragm and a glass envelope of the receiver.

The opposite edge of the diaphragm edge 70 provides an envelope edge 72 which is secured to the glass envelope end 24. This can be done by preparing the envelope edge 72 by proper heat treating to form an oxide on the surface, followed by heating the components to a sufficient temperature and fusing them to one another. The section 54 is connected to the end surface 48 as shown in FIG. 4. This is done by first heat-treating the envelope edge 72 to form a rough oxide layer on its surfaces, and then embedding a thin protruding portion of the section 54 directly into the glass end surface 48 so that there is glass on either side of the joint. In the alternative, the section 54 could also be secured to the inner or outer diameter surfaces of the envelope 22.

Figure 5:
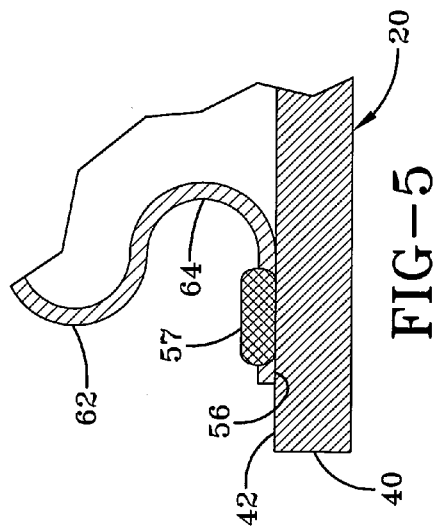
FIG. 5 is a detailed view of a connection between the diaphragm and an absorber tube of the receiver.

The attachment of the diaphragm 32 to the metal absorber tube 20 is shown in FIG. 5. The welding landing 56 is connected to the end 40 by a conventional continuous weld 57 about the entire circumference of the end outer surface 42. The welding landing 56 may be positioned flush with the end

40 or slightly inset as shown in FIG. 5. Skilled artisans will appreciate that the connections between the metal tube and the glass envelope via the diaphragm 32 allows for a vacuum seal of $1\times10^{-6}$ Torr or lower.

The disclosed configuration is advantageous in that it significantly reduces the axial length of the attachment so as to reduce the shading of the absorber surface, thus increasing receiver efficiency by allowing more area of the absorber to be exposed to the sun and the reflected rays of the mirrors. Because of this reduced diaphragm size relative to conventional bellows, a minimum of the diaphragm's surface is exposed to air, further increasing the efficiency by reducing heat loss from radiation and convection. This configuration is also much less costly than other configurations in view of the simplified diaphragm configuration. In other words, by aligning the convolutions in a horizontal manner, or along the radial projection from the end of the tube to the end of the envelope, shading is minimized on the solar selective surface of tube 22, thus increasing the efficiency of the trough receiver. Skilled artisans will appreciate that in view of the significant number of receivers in a solar array field, typically about 80,000 receivers, even a slight improvement in efficiency of the absorber tube of up to 1% can have a significant cost savings and improvement in efficiency of the overall power generating system. Indeed, any improvement in the optical efficiencies of solar receivers is a direct one for one improvement in the overall solar receiver efficiency. This directly effects the overall efficiency of the power generating system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A solar collection assembly comprising:
 a metallic tube adapted to carry a heat transfer medium therethrough;
 an envelope surrounding said tube and having opposed ends; and
 a diaphragm interposed between each said end and said tube to support said tube from said envelope,
 said diaphragm comprising:
 radially oriented metallic, serpentine-shaped convolutions, wherein said convolutions comprise a series of outer ridges and inner grooves adjacent to one another; and
 a metallic attachment ring extending axially from and continuously welded to one of said metallic convolutions at one end, said metallic attachment ring having an outer diameter substantially equivalent to a diameter of said envelope and connected thereto at an end opposite said convolutions, wherein one of said metallic convolutions at an end opposite said attachment ring has an axially extending welding landing, wherein said welding landing is continuously welded to said metallic tube such that all said outer ridges are radially aligned with said welding landing, and wherein the said convolution furthest away from said welding landing provides a ring landing which is secured to said attachment ring.

2. The assembly according to claim 1, wherein said welding landing forms a tube hole that receives said tube.

3. The assembly according to claim 1, wherein at least one of said ends of said envelope has a surface that receives said attachment ring.

4. The assembly according to claim 1, wherein said convolutions and said attachment ring are made of dissimilar metallic materials.

5. The assembly according to claim 4, wherein said convolutions are constructed from a metal selected from the group consisting of carbon steel, stainless steel and Fe—Ni alloys.

6. The assembly according to claim 1, wherein said diaphragm connects said metallic tube and said envelope to form a vacuum seal of $1\times10^{-6}$ Torr or lower.

7. The assembly according to claim 4, wherein said convolutions are constructed from stainless steel.

8. The assembly according to claim 4, wherein said attachment ring is constructed from nickel cobalt ferrous alloy.

* * * * *